June 20, 1961     J. M. CRAWFORD ET AL     2,989,726
METHOD OF AND APPARATUS FOR DETERMINING THE TRAVEL
TIME OF A VIBRATORY SIGNAL BETWEEN SPACED POINTS
Filed April 28, 1954     7 Sheets-Sheet 1

INVENTORS
WILLIAM E. N. DOTY AND
BY   JOHN M. CRAWFORD

*Oberlin & Limbach*

ATTORNEYS

June 20, 1961  J. M. CRAWFORD ET AL  2,989,726
METHOD OF AND APPARATUS FOR DETERMINING THE TRAVEL
TIME OF A VIBRATORY SIGNAL BETWEEN SPACED POINTS
Filed April 28, 1954                                7 Sheets-Sheet 2

INVENTORS
WILLIAM E.N. DOTY AND
BY  JOHN M. CRAWFORD

ATTORNEYS

FIG. 6  INTEGRATION TIME INTERVAL
(SECONDS)

DELAY TIME IN MILLISECONDS

FIG. 11 — FOUR SECOND SWEEP FREQUENCY AUTOCORRELATION
$f_i = 200 \cdot 7T$ SQUARE WAVE GRAPHICAL METHOD

FIG. 12 — TWO SECOND SWEEP FREQUENCY AUTOCORRELATION
40 TO 80 N/SEC

FIG. 13 — Correlation of signal containing infinite frequency range.

United States Patent Office 2,989,726
Patented June 20, 1961

2,989,726
METHOD OF AND APPARATUS FOR DETERMINING THE TRAVEL TIME OF A VIBRATORY SIGNAL BETWEEN SPACED POINTS
John M. Crawford and William E. N. Doty, Ponca City, Okla., assignors to Continental Oil Company, Ponca City, Okla., a corporation of Delaware
Filed Apr. 28, 1954, Ser. No. 426,182
7 Claims. (Cl. 340—15)

In the co-pending application of Doty et al., Serial No. 339,374, now Patent No. 2,688,124, filed February 27, 1953, there is disclosed the method of determining the travel time, between spaced first and second points, of a unique signal having vibration energy which is nonrepetitive during a period which is at least as long as such travel time, comprising
(a) Transmitting such a signal from said first point,
(b) Providing a counterpart of said transmitted signal,
(c) Multiplying (i) at least a substantial portion of the total transmitted vibration energy of said signal which is received at said second point, by (ii) said counterpart signal,
(d) Integrating for a substantial period the product of said multiplication, and altering the phase relation between said counterpart signal and said transmitted signal during successive integrating periods, and
(e) Recording the values derived from such integration; whereby the out-of-time-phase relation of said counterpart signal with respect to the transmitted signal at said first point, which yields the greatest value from such integration, may be used as a parameter of the travel time of said unique signal between said points.

It is a principal object of the present invention to provide a method which is an improvement over the method aforesaid of said co-pending application. The present improved method is characterized in that the results to be determined are capable of being secured much more readily, much more rapidly, by the use of a wider variety of equipment and at a less expenditure of time and effort.

It is a further object of this invention to provide a method of the character described which is of greater flexibility.

Other objects of the invention will appear as the description proceeds.

The following description and the annexed drawings are merely illustrative of one mode by which this invention may be carried out and its use in other fields will be apparent.

In said annexed drawings,

FIGURE 3A is a reproduction of a portion of an actual field record produced by a field setup like that illustrated in FIGURE 2.

The method which comprises the present invention may be divided into two parts. The first part may be broadly defined as the method of making a record from which may be determined the travel time along at least one path of propagation between spaced first and second points of a vibratory signal which is nonrepetitive during a time interval which is substantially longer than the travel time of such signal along any of those paths of its propagation by which it reaches said second point at usable energy levels which comprises
(a) Transmitting such signal from said first point, and
(b) For a predetermined period recording simultaneously and individually, parameters respectively of a counterpart of said transmitted signal and the signal as propagated to said second point over at least one of said paths, the record so provided being such that said parameters may be reproduced therefrom in a known phase relationship relative to their phase relationship as recorded, said predetermined period having a time duration which is at least as long as said travel time plus the uninterrupted duration of said transmitted signal.

The second part of the method which comprises the present invention utilizes the record produced by the method forming the first part of this invention and comprises the following steps:
(1) Generating representative signals which are each respectively indicative of the frequency, amplitude, and phase relation of said recorded signals, (2) Multiplying said representative signals and integrating for successive substantial periods the product of said multiplication, (3) Altering the phase relation between said representative signals during such successive periods, (4) Recording the values derived from such integration; whereby the out-of-time phase relation of said representative signals which yields the greatest value from such integration for a given period is a parameter of the travel time of said transmitted signal between said points, (5) Said nonrepetitive signal being transmitted from said first point for a period of time which is at least as long as the time interval during which said received signal and said counterpart signal, in phase coincidence, must be multiplied and integrated to provide in the sum a ratio of at least 2 to 1 between the parameters of signal and noise.

The steps specified in (4) above yield values of multiplication and integration which may be recorded or plotted as ordinates of a "correlation curve." The abscissae are the corresponding values of time delay of the counterpart signal for each individual multiplication and integration. In plotting such a correlation curve, the time of integration for each individual time delay must either be a constant value or a correction must be applied to compensate for variations from the constant value.

The improved method comprising the present invention can best be understood by having reference to an illustrative form of apparatus which may be used in carrying out such method. By having reference to FIGURE 1, there is here illustrated a vibrator generally indicated at 1 which comprises a weight 2 rotatably supported on an axle 3 on a base 4 which is adapted to couple to the earth. While the vibrator or transducer thus illustrated in FIGURE 1 employs only a single off-center weight, it is nevertheless within the contemplation of this invention to utilize a multiple array of off-center weights on counter-rotating shafts such as are illustrated in the aforesaid copending application. The energy source or transducer which may thus be used to generate the initial unique signal which is nonrepetitive for substantial periods may be of any other type which can transmit a compressional wave into the earth, preferably with a controllable frequency and substantially constant energy.

It should be noted that the method comprising this invention is not dependent upon the use of signals of any particular frequency or amplitude or signals in which there is any particular uniformity of frequency or amplitude.

In the adaptation of the method to a particular field of use, the frequency and amplitude are many times of great importance because of factors such as the characteristics of the propagation medium. For example, in the application of the method to seismic exploration, the frequency range of from 20 to 80 cycles per second has been found to be unexpectedly critical for best results.

Electromechanical transducers may utilize an engine driven A.C. generator coupled electrically to a large electromagnet, a massive member of which is caused to vibrate in synchronism with the A.C. current from the generator. The speed of the engine controls the frequency of the generated A.C. voltage and the frequency of vibration of the transducer. Amplitude of transducer vibrations and hence the energy output is easily controlled by means of well-known methods of controlling the A.C. current output to the transducer coils.

It is very easy to generate a signal which is unique, that is, nonrepetitive for a length of time as specified in (5) above. One simple way which is especially useful in seismic exploration is to start with a frequency of vibration such as 20 cycles per second and to steadily increase the frequency of vibrations to about 80 cycles per second during an elapsed time of about four seconds.

The frequency can then be allowed to decrease to approximately 20 cycles during the next four seconds and then the whole process repeated as many times as necessary. In using the engine driven vibrator with off-center weights, the operator may start with the engine running at a speed which causes the vibrator to generate 20-cycle energy and may then accelerate the driving engine speed so that the vibrator is running at 80 revolutions or vibrations per second at the end of four seconds. A brake may then be applied and the entire apparatus slowed to 20 revolution per second during the next four seconds. The absolute rate of acceleration and deceleration is not critical nor does it need to be duplicated exactly during successive runs. The only requirement is that the transition occur in no less than four seconds and that it follow the general scheme outlined.

The four-second time interval minimum has been chosen for purposes of illustration in the field of seismic exploration for the reason that four seconds is generally the greatest travel time of seismic waves which are practical and yield usable information.

The same technique applies to an engine driven A.C. generator which in turn drives an electromechanical transducer or vibrator. Means for similarly varying the frequency of the electronically generated A.C. voltage are well known.

Further variations of the apparatus for signal source may include electronic means for generating, controlling, and amplifying the A.C. power necessary to cause the electromagnetic transducer to vibrate in the desired manner.

Instead of using a vibrator or transducer which generates an elastic wave, of which two examples have been given, we may also use a vibrator or transmitter which will create an electromagnetic wave. There are many types of apparatus well-known to those familiar with the art which are capable of generating such an electromagnetic signal. A common form of such apparatus is an electromagnetic wave transmitter composed of a variable frequency oscillator driving a power amplifier.

Another form of apparatus which may be used for the purpose of generating an electromagnetic signal is the well-known form of alternator.

Figure 1:
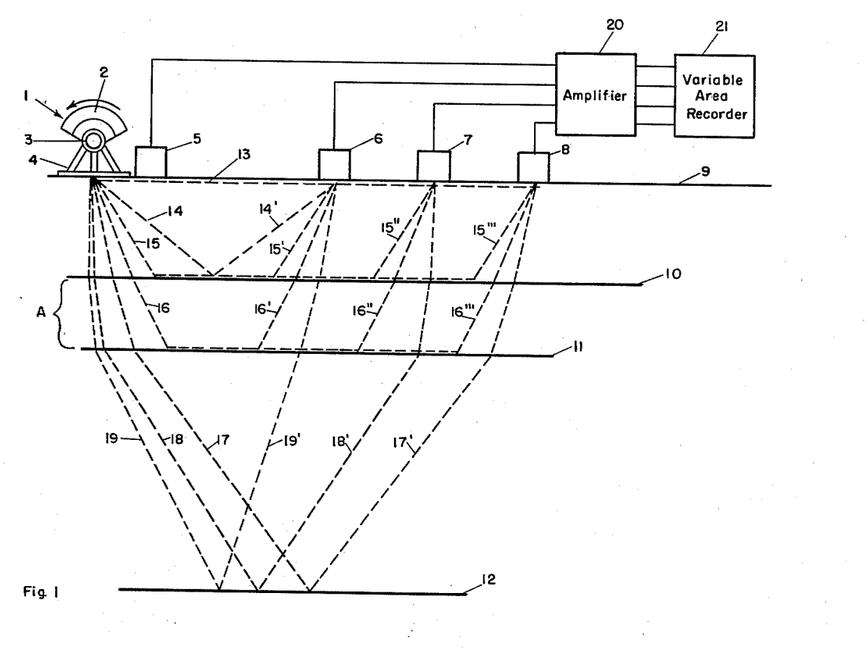
FIGURE 1 is a diagrammatic representation of a field setup showing the manner in which this improved invention may be used in seismic exploration and in the production of a record which is useful in making numerous determinations among which are those with which the further refinements of the present method are concerned.

Shown associated with the signal generating means is a detector generally indicated at 5 which is so positioned either on the base of the transducer, on the earth sufficiently close to the transducer, or otherwise so as to pick up a signal which is substantially identical with the signal which is transmitted by the transducer or vibrator into the earth. The signal detected or picked up by the detector 5 will be referred to hereinafter for convenience as the counterpart signal.

Placed on the earth in accordance with standard practice in seismic exploration are a plurality of remote detectors 6, 7, and 8. The detectors for receiving the earth or transducer vibrations may be conventional seismometers, preferably of the type which have nearly constant response to all vibrations except that the detector 5 is so constructed as to withstand high amplitude vibrations and to yield an electrical signal comparable with that obtained from the remote detector 8. The detectors thus employed may be used in any sort of multiple, series, parallel, or series-parallel arrangement to yield desirable collective sensitivity to energy from one direction, such as vertical, and insensitivity in another direction, such as lateral. These arrangements or "nest" groupings are identical in form and intent with groupings in normal seismographic exploration methods utilizing explosives as the energy source.

In FIGURE 1, the solid horizontal line 9 has been drawn to indicate the surface of the earth. The line 10 has been drawn to indicate the upper surface of a bed A, the lower surface of which is indicated by the line 11. The line 12 has been drawn to illustrate the upper surface of yet another but deeper bed. Several of these beds usually made up of acoustically different material than the remainder of the earth penetrated by the signal will effect reflection and refraction of the signal entering the ground.

The several sets of dotted lines which appear on FIGURE 1 have been drawn to illustrate various paths along which the single signal generated by the transducer may be propagated and reach the detectors 6, 7, and 8 for example. The line indicated at 13 is commonly referred to as the direct path. The line 14—14' is illustrative of a simple reflection. The line 15 indicates how the signal may propagate along a path which is refracted at the upper surface of the bed A and refractions of the signal from the upper face of the bed A progress along paths 15', 15", and 15'" to the detectors 6, 7, and 8, respectively. Similarly, 16 illustrates a double refracted path, i.e., traveling along the surface of the lower face of the bed A and reaching detectors 6, 7, and 8 along paths 16', 16", and 16'", respectively. Lines 17, 18, and 19 are illustrations of refracted and reflected paths by which the signal may progress and finally reach the detectors 6, 7, and 8 along paths 19', 18', and 17'.

Figure 3:
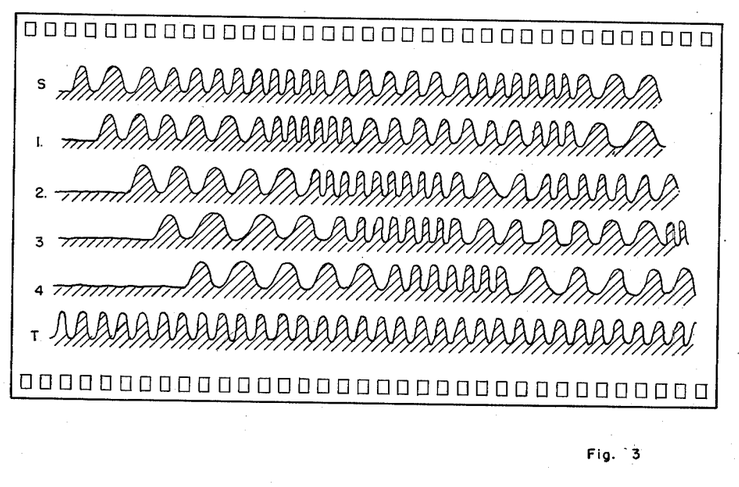
FIGURE 3 is an illustration of one type of record which may be produced, for example, by the field setup illustrated in FIGURE 1.

The electrical signals generated by the detectors 5, 6, 7, and 8 in response to the elastic waves received thereby or the electromagnetic impulses detected thereby are fed to separate amplifiers or a multichannel amplifier generally indicated at 20 wherein their strength is increased and from which they progress to the recorder generally indicated at 21, which may be a variable area recorder and thus capable of producing a continuous record strip like that illustrated, for instance, in FIGURE 3.

The recorder 21, while indicated as being of the variable area type, may nevertheless be of various different forms. Common types of well-known recorders which may be used in place of the variable area recorder 21 are sometimes referred to as being of the types which may variously be defined as photographic, electrical, acoustical, or magnetic. The record which is produced by the recorder 21 must be such that it may be stored for a substantial period of time since it is usually made by equipment in the field and then carried to a central laboratory or office for further processing, and this may occur at a much later time. The record thus made must be capable of being reproduced or of generating representative signals which are each respectively indicative of the frequency, amplitude, and phase relation of the signals originally recorded, i.e., permitting such signal to be derived from the record.

At this point, it might be well to note the type of signal which may be sent into the ground, i.e., the transmitted signal must be vibrational, and it may be either elastic or electromagnetic. The mechanical transducer utilizing an unbalanced weight is a simple means of generating an elastic wave. As indicated above, a simple means of generating an electromagnetic wave is by means of an electromagnetic wave transmitter or an alternator. When an elastic wave is utilized as the transmitted signal, then the detectors may be the common form of geophone used in seismic exploration as, for example, when using an explosive as the signal generating means. When the transmitted signal is electromagnetic, then the detectors will take the form of coil or other antenna capable of picking up an electromagnetic signal.

Figure 2:
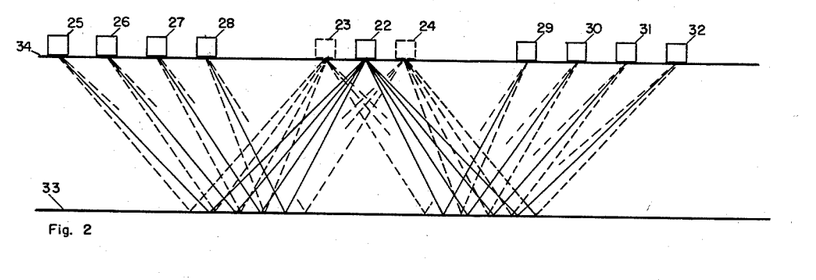
FIGURE 2 is a diagrammatic representation of yet another field setup showing a refinement by which a record may be produced which is generally similar to that produced by the setup in FIGURE 1 but which contains vastly more useful information and is thus of greater utility.

In FIGURE 2 the horizontal line 34 has been drawn to denote the surface of the earth. The horizontal line 33 has been drawn to denote a subsurface reflecting bed. In this figure, we have shown three vibrators, 22, 23, and 24, which may be either a single vibrator moved to each of these locations consecutively or three separate independent vibrators may be positioned at those points.

In this figure we have shown also a split spread of detectors, the left-hand spread consisting of detectors 25, 26, 27, and 28 and the right-hand spread of detectors comprising numbers 29, 30, 31, and 32.

Apparatus such as is illustrated in FIGURE 2 has associated therewith an amplifier and recorder as shown in FIGURE 1 at 20 and 21, respectively, and also a detector the equivalent of detector 5 at or adjacent the vibrator for the purpose of picking up a signal which is used to generate the counterpart signal.

The arrangement shown in FIGURE 2 of the multiple vibrator setup has been observed to improve the identification of the vertical arrivals or reflections on the final plotted records as contrasted to the horizontal arrivals which are ordinarily of no geological significance. It is similar to the improvement observed in conventional seismic practice when using multiple shots. The cause of this improvement is not too well understood; however it is quite obvious that the shift shown for the vibrator at 22, 23, and 24 would not constitute a very large time shift for the reflected event at the respective detectors whereas a horizontally traveling path would be considerably shifted in time at the different locations 22, 23, and 24; consequently, the reflected (vertical) energy would add to good advantage as contrasted with horizontally traveling energy. It has also been noted that the vibrator output energy is affected by the physical characteristics of the earth in immediate vicinity of the vibrator. The multiple setup as shown in FIGURE 2 provides a better sampling of the conditions such that a more representative record associated with that location is secured. This effect is somewhat similar to that accruing from the use of a single vibrator position and multiple detector positions. Multiple vibrator positions in conjunction with multiple detector positions provide even better record quality. It should be noted that when records are obtained from vibrators at positions 22, 23, and 24 and assembled into one composite record the net effect is the same as if vibrators at positions 22, 23, and 24 were operated simultaneously. Thus, the improvements in record quality effective in the conventional practice of simultaneous multiple shots can be attained in this technique even though the various energy points may be occupied by the vibrator at different times. It should also be noted that in the event that positions 22, 23, and 24 do not provide the desired record quality, it is possible to return and occupy additional vibrator positions and assemble the records from the various vibrator positions into a single final record. It is quite apparent that the field practice for this type of technique is very simple since there is no necessity for synchronism either as to character of or time of generation of the signals generated at the various vibrator positions. The particular time at which a vibrator occupies a position is of no significance whatsoever. It should be re-emphasized that the positions 22, 23, and 24 in the technique just described represent movements which do not provide an appreciable time shift in the particular reflection events at the respective detectors such that the reflection energy arriving at the detector No. 25 for instance from vibrators positions 22, 23, and 24 will add to good advantage.

A technique will now be described which is contrasted to that described above in that positions 22, 23, and 24 are appreciable distances apart such that the reflected arrivals from positions 22, 23, and 24 at the far detector are definitely shifted in time to each other and do not add in time phase.

In this case, it will be necessary to record on separate tracks of the recording apparatus the counterpart signals from each vibrator position. In this case, the approximate corrections can be introduced on the respective counterpart signals such that the reflected energy arriving at the particular detector from vibrator positions 22, 23, and 24 again add in time phase. This causes a still further out-of-phase time displacement for horizontally traveling paths since larger distances were used, and the correction which enabled the vertical arrivals to add in phase did not constitute a significant correction for the horizontally traveling paths. It is realized that the approximate corrections mentioned before will be applicable to a limited range in reflection time, that is, another approximate correction would have to be applied for a bed twice as deep as that shown as 33 in FIGURE 2. It is further realized that the approximate correction does not apply equally well to detector positions 25 and 28 for instance, but the correction can be adjusted to fit a median position and geometry of the vibrator shift and the detector placement must be compatible with the depths to be investigated.

The advantage of multiple detector positions to make up one trace has long been recognized in conventional seismic practice. In the technique of the present invention, one seisphone can be used a multiplicity of times to make a final record which is the full equivalent of the multiple detector setups used in conventional practice.

It has also been observed that record quality improvement can be obtained by interchanging the position of the vibrator and the detector to form a single record which represents results secured when the energy travels in both directions. For instance, consider vibrator position 24 and detector position 32 in which the energy travels from the vibrator to the detector or from 24 to 32. Now interchange the position of the detector and the vibrator such that the energy travels the identical path except it has traveled in the opposite direction (from 32 to 24). Such records just described have shown a difference from records obtained from one direction only of energy travel that is valuable to those interpreting the geological significance of these records. Likewise, this technique can be employed to obtain records of paths from vibrator positions 22, 23, and 24 to detectors 29, 30, and 31, respectively.

The record which has been illustrated in FIGURE 3 as having been formed on photographic film is as previously indicated of the variable area type such as may be produced by the recorder illustrated in FIGURE 1. As likewise referred to above, the record FIGURE 3 need not be the variable area type but may be either photographic, electrical, acoustical, or magnetic. Whatever form is selected for use, and there are numerous instruments available capable of using each of these forms of record, we shall refer to such record hereinafter for convenience as a "memory" record for the reason that it is a long-term memory device from which may be generated signals which are representative of the frequency, amplitude and phase relation or time shift of the signals recorded on the original record. The record shown in FIGURE 3 is an idealistic situation which is theoretically perfect and, of course, is not the type of record which would ever be secured in actual field practice. It has been illustrated, however, in this form for the purpose of facilitating explanation of the present invention.

The trace T on the record is a time trace made by a signal in the recorder itself and, while on a theoretical record of this type, it might be generally indicative of the amount of out-of-time-phase relation between the various traces, in an actual field record where conditions are not perfect as illustrated in FIGURE 3, the trace T cannot be used practically for this purpose with any degree of accuracy. An important use of the time trace T is that it provides a means for comparison between the speed at which the record was made and the speed at which it is played back.

The trace at the top of the record marked S is the trace of the counterpart signal, i.e., the signal picked up by the detector 5 at or adjacent the transducer and the remaining traces 1, 2, 3, and 4 are representative of the signals picked up by four detectors.

The record shown in FIGURE 3 constitutes a very simple field case in that one path is very much predominant over other paths. A distinct step-out time or the time delay from detector to detector down the spread is observed. If two or more paths which transmit signals of approximately equal amplitude are involved, this apparent step-out time is very well masked in that various frequencies beat; and there is no apparent time that can be visually determined from such a record. It should be noted that in the case illustrated there is no noise or no energy on these traces other than that generated by the vibrator. This is never the case in normal field conditions wherein noise obscures the signal generated by the vibrator. The dead portion of trace preceding the vibrational energy corresponds to the time before the vibrator is started. The actual record used in this technique would normally contain none of this vibrator-off position of the record since the recorder is normally not started until after the vibrator has been started. In the succeeding portions of this description, reference to field records and their interpretation is generally made with the understanding that the recording period commenced after the starting of the vibrator by a time interval at least as long as the travel time being determined; however, in those cases where the duration of the period during which the nonrepetitive signal is being generated is short, and especially when it is shorter than the travel time, for example when detonating a plurality of closely time-spaced explosions, it will usually be best to start the recorder before initiating this type of signal. This procedure will minimize blank record intervals and facilitate interpretation. In the normal case, traces 1, 2, 3, and 4 will appear absolutely independent or bear no readily evident or visually recognizable relationship to each other. For the purpose of illustrating the difference between this theoretical case and the actual field case, FIGURE 3A is shown. The difference noted between FIGURES 3 and 3A is not altogether due to two or more paths transmitting signals of approximately equal amplitude. FIGURE 3A displays noise energy as well as signal energy.

At this point, it will be necessary to define "noise" and "interference." Noise is defined for the purpose of this invention as any energy arriving at the detectors, which is not derived from the transmitted signal. Its level is readily determined by making a record with the vibrator inoperative. This type of noise is readily removed from the parameters of signal and noise herein discussed. Longer integration times readily increases the ratio of the signal and noise parameters. Common sources of noise are wind, ground traffic, airplanes, cattle, etc., or any other disturbances imparted to the earth foreign to the vibrator energy.

As contrasted to this type of "noise," is "interference" which appears on the final correlated record, which is undesired motion of the trace in that it cannot be readily interpreted but which is apparently due to energy traveling from the vibrator to the detector via some unknown path. While interference is reduced by the use of the present technique, such reduction is not, however, as in the case of noise, proportional to the duration of the integration time. Signal-to-interference ratio can be improved also by field practice such as particular vibrator setups or detector setups such as described in connection with FIGURE 2.

The complexity of the received signal is therefore the result of the superposition of three components of energy and the effect of the earth on the phase and amplitude of each of these components of energy. The three components of energy are (1) the desired signal made up of the energy reflected or refracted at earth interfaces, (2) "interferences," and (3) "noise."

It has been pointed out that the present technique eliminates noise to a much greater extent or substantially any desired extent whereas this cannot be done in conventional seismic practice. Whereas interference is reduced by the use of the technique of this invention, it is true also that the nature of the energy source used is such that it does not generate as large a ratio of interference to signal as in conventional practice. This is due to a certain extent to the fact that the strains imparted by the vibrator remain in the elastic limit of the earth material; whereas the shot technique creates much crushing. Another contributing factor is the much greater control of the frequency spectrum realizable in the vibrator technique as contrasted to shot practice. It has been found highly desirable to control the output spectrum of the vibrator in accordance with the surface materials or near surface conditions in the vicinity of the vibrator, that is, it has been found that certain frequency bands create a small signal-to-interference ratio while another portion of the spectrum may generate a large signal-to-interference ratio. Since the technique of this invention operates in the time domain and it is immaterial when the signal is generated, it is possible to create any desired frequency spectrum. For instance, the earth attenuation effects can be compensated for by transmitting longer at a particular frequency in order to build up the desired flat frequency content of the product of received signal and counterpart signal within the frequency range. This is contrasted to conventional seismic practice wherein the energy must be introduced into the earth instantaneously, in which case it is practically impossible to control its frequency spectrum.

Figures 4, 4A:
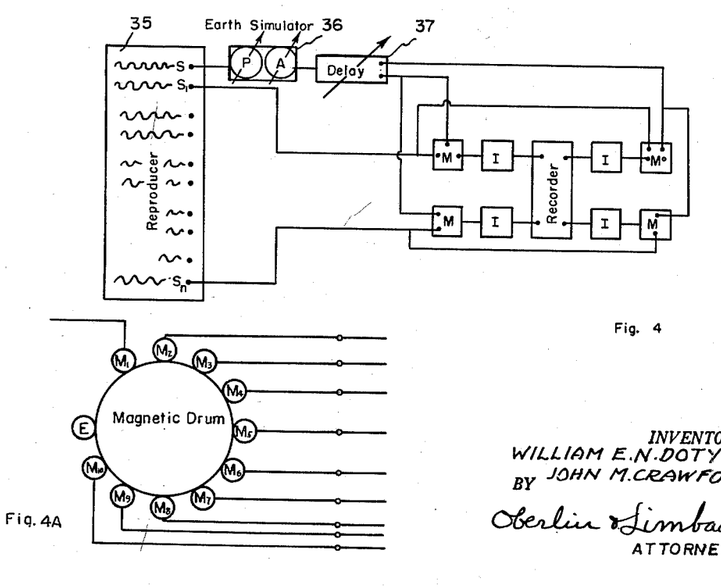
FIGURE 4 is one form of multichannel apparatus by which a record such as that produced from the field setups such as shown in FIGURES 1 or 2 may be translated into valuable information from which may be determined the travel time of the signal.
FIGURE 4A is a representative of an improved time delay device whereby a signal stored on a magnetic drum may be delayed simultaneously by incremental amounts.

The description of the apparatus which has been given thus far, has been concerned only with the production of what has been called, for convenience, the memory record. Such a record is produced by the recorder indicated as the ultimate apparatus in FIGURE 1. In FIGURE 4, there is illustrated a form of apparatus which utilizes this memory record. This memory record is indicated diagrammatically as fed to the reproducer indicated at 35 and generates a signal which is representative of the frequency, amplitude, and phase relation of the original transmitted and received signals.

At S in FIGURE 4, a signal representative of the counterpart signal is generated. For the remainder of this discussion, this representative signal of the counterpart signal will be referred to as the counterpart signal. Similarly, at $S_1$ through $S_n$ in FIGURE 4, signals representative of those received at the detectors are generated. For the purpose of this discussion, these will be referred to as received signals. The representative signal generated by reproducer 35 will always be vibrational; and its energy may be of electrical, acoustical, or electromagnetic nature. Electromagnetic is intended to include light. The counterpart signal is fed through the earth simulator, which will be described in greater detail later and then fed into the variable delay device. It is to be realized that regardless of how the received signals are treated, it is always the same counterpart signal by which they are multiplied; consequently, it can be seen that for any particular delay of the counterpart signal, it can be simultaneously multiplied by all received signals. More specifically in FIGURE 4, the counterpart signal for a particular delay is multiplied simultaneously by the received signals generated by reproducer 35, $S_1$ through $S_n$, only two of which are shown in FIGURE 4.

By providing a plurality of pickup head $M_1$—$M_{10}$, it is possible to simultaneously delay the counterpart signal by ten different integral amounts. If all ten of such heads are used simultaneously then, of course, each must be provided with an individual set of multiplying and integrating circuits and thus ten points of this corresponding correlation curve are simultaneously obtained. When this is done ten different delayed counterpart signals may be multiplied and integrated simultaneously with each of the received signals.

It should also be remembered that the fixed delay of the counterpart signal is maintained for a predetermined integration time and then advanced an incremental amount, this incremental advance affecting each of the simultaneous delays of the counterpart signal at the output of the delay device. In effect, in terms of FIGURE 3, this is essentially moving trace S longitudinally along the record a fixed incremental amount and then multiplying and integrating for the predetermined time by traces 1, 2, 3, and 4. At the end of this time, trace S is further advanced an incremental amount and the process repeated at the new position.

By utilizing a multiple delay device as illustrated in FIGURE 4A and the associated mechanism which is used therewith as described, the net effect can be stated as simultaneously performing the multiplying and integrating procedure as explained in the next preceding paragraph for ten different relative time positions of the trace S with respect to the other traces.

The earth simulator compensates for the phase and amplitude distorting effects introduced by the earth acting as a conducting medium for seismic waves. It has been observed that the earth attenuates certain frequencies to a greater extent than others. This effect modifies the shape of the correlation curve. This modification of the correlation curve may very well be undesirable; consequently, the earth simulator has been provided to compensate for the effect of the earth. The particular adjustments of the phase and amplitude required to provide the desired correlation curve shape constitute further data which may be of significance as regards the nature of the material through which the energy has traveled.

The earth simulator consists of a combination of an attenuator, and phase shifting network, which units are available and may be connected in various combinations so that the distorting effect of such combination on the transmitted signal is substantially the same as the distorting effect of the earth on the same signal.

The multiplying and integrating steps involved in correlating the counterpart and the received signals can be performed with many different types of equipment. Mechanical or electrical multipliers and integrators can be used, but electronic multiplier and integrator of the analog type is preferred. The multiplier and integrator designated by M and I in FIGURE 4 are of such type. The recorder is a mirror-galvanometer type of photographic recorder adapted to record, for each of the respective integrators, the final sum at the end of each integration period. The form of the delay device may be a magnetic delay drum with one or more pickup heads such as $M_1$–$M_{10}$ shown in FIGURE 4A. Alternatively the reproducer may be provided with movable pickups at the generation points at $S_1$ and $S_n$ whereby the instants at which the several traces are picked up and reproduced may be relatively adjusted. The precise forms of delay device used will, of course, depend on the nature of the generated representative signals. Different types of delay devices will be used for vibrational, electrical, acoustical, light, or electromagnetic signals.

The relative position of the earth simulator and delay device is not significant.

The multiplier designated by M should be of such a nature that there is no coupling between the representative received signal and the delayed counterpart signal entering each particular multiplier.

In connection with the previous explanation of FIGURE 4 and also FIGURE 3, it was pointed out that the counterpart signal should be multiplied by each of the received signals for a length of time sufficient to provide a significant value at the end of each multiplication and integration period. When the multiplication and integration period is continued long enough, there is developed a sufficiently great signal-to-noise ratio; and the time-phase relationship of the signals being multiplied can be clearly established. Each peak on the correlation curve thus derived indicates absolutely that the counterpart signal and a received signal are in time phase at that particular time delay of the counterpart signal.

Figure 5:
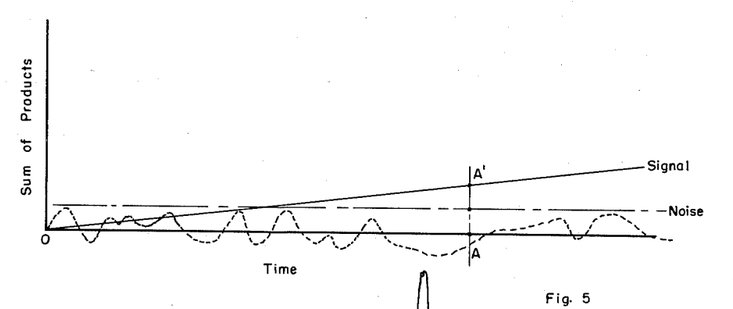
FIGURE 5 contains two curves which illustrate the signal-to-noise ratio which may be secured by the use of the method of this invention, the broken line being indicative of the values determined by apparatus such as that illustrated in FIGURE 4 when no signal is transmitted between the first and second points, i.e., the values determined when only a signal or its counterpart and "noise" are multiplied and integrated; and the solid line being indicative of the values determined from the apparatus such as that illustrated in FIGURE 4 showing a parameter of the signal.

The length of time during which such integration should be carried on in order to make sure that all peaks derived are truly indicative of an in-phase relationship is generally such that the signal to noise ratio is at least 2 to 1. In FIGURE 5, the solid trace illustrates the continuing sum which may be obtained when the counterpart signal is multiplied by a received signal in an in-phase relationship. The broken trace illustrates the continuing sum which may be obtained when the counterpart signal is multiplied by noise as defined above. It will be noted that the ordinate variations of the broken curve are quite large compared with the corresponding variations of the solid curve. This implies that the noise level is much higher than the signal level; however the solid line ordinate at A, representing the correlation value of the signal for that particular integration time, is predominant over the peaks of the broken (noise) curve because of the consistent in-phase relationship of the received signal with the delayed counterpart signal as contrasted to the random phase relationship between the counterpart signal and noise.

In case of high level noise, the record amplitude obtained while no signal is generated and the rate at which the integration sum builds up while a signal is being generated can be used to predetermine the approximate integration time required to establish at least a 2:1 signal-to-noise ratio.

If the amount of interference at the outset of the integration period is substantially equal to the true signal, then it is difficult to determine a true peak of phase coincidence regardless of how long the integration period is continued. However, the type of signal employed in this invention generates less interference than explosives now employed in conventional seismic practice. The present method is thus useful in many areas where conventional seismic practice is not.

When a first record yields such a high interference to signal ratio that it is not possible to determine therefrom peaks on the correlation curve denoting phase coincidence, then by using the procedure described in connection with FIGURE 2 other records can usually be secured which, when combined with said first record, will yield a composite record from which phase coincidence can be determined.

Figure 6:
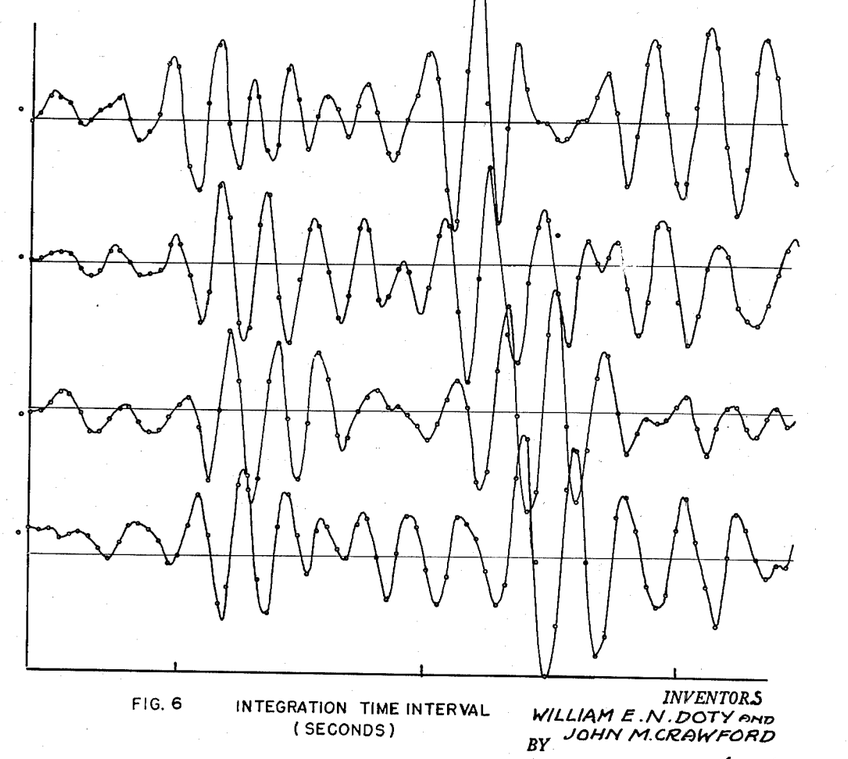
FIGURE 6 shows a curve or more accurately a group of curves showing the data obtained from apparatus such as that illustrated in FIGURE 4 when utilizing a field record such as has been produced by a setup as illustrated in FIGURE 1.

The traces of FIGURE 6 represent correlation curves. It is a plot of the integrated products of the counterpart signal and the received signal. To consider one curve, it will be noted that at each fixed interval there is a point plotted. This corresponds to the value of the integrated product for a fixed integration time, each successive point being arrived at by increasing by finite increment the delay of the counterpart signal, compared to the received signal, and integrating for the predetermined length of time. The curve is traced by drawing a continuous line through the above-described points. The other curves corresponding to other received signals are obtained in a similar manner. The space along the abscissa between said points corresponds to a known increment of time shift of the counterpart signal. Abscissa values in seconds or fractions thereof on FIGURE 6 represent the total time shift of the counterpart signal at all points. Hence peak X occurring at an abscissa value of .318 second shows that the signal from which that correlation peak was derived had a travel time of .318 second.

The interpretation of such correlated records is quite similar to the well-konwn interpretation methods used in conventional seismic practice. The time shift increments of the counterpart signal must be compatible with the frequency content of the signals to insure that the curve can be traced from point to point with no possibility of leaving out significant data and such that the time of a correlation peak can be accurately determined. The true relative amplitude of the energy arriving via different paths is indicated on these correlation curves, since no amplitude control scheme has been applied. The relative amplitude of the energy arriving via the different paths can be significant in making the interpretation of the geological condition involved.

The correlation curves denoted in FIGURE 6 do not correspond to absolute spikes or sharp peaks but have a rather oscillatory appearance. This correlation curve shape is a function of the frequencies present in the signal.

There are many factors which determine the best frequencies for the transmitted signal. It has been found that best results are secured in seismic exploration when employing the process of this invention, by the use of transmitted signals in which the frequencies lie in the range of from 20 to 80 cycles per second. While the use of this relatively narrow frequency range precludes the possibility of forming sharp spikes or peaks on the correlation curves nevertheless the correlation curves which can be obtained from the use of frequencies of from 20 to 80 cycles per second are sufficiently distinct for the purpose of determining phase coincidence. The other advantages resulting from the use of this narrow band of frequencies outweigh the slight disadvantage of not having sharp peaks on the correlation curve for phase coincidence determination.

The process of this invention can be used with transmitted signals of any frequency. The best frequency for any purpose will depend largely on the characteristics of the transmission medium by which the transmitted signal is propagated. In seismic work this range is, as stated, from 20 to 80 cycles per second. Even in certain types of seismic work it will be found advantageous to use frequencies which lie in the range of from 20 to 200 cycles per second or even higher. It is important to realize that correlation functions are symmetrical about their phase coincidence points and that oscillations immediately preceding and following such points, although present, are not significant. FIGURE 6 actually represents correlations of energy which have been propagated from a vibrator through the earth to a distant detector.

Figure 7:
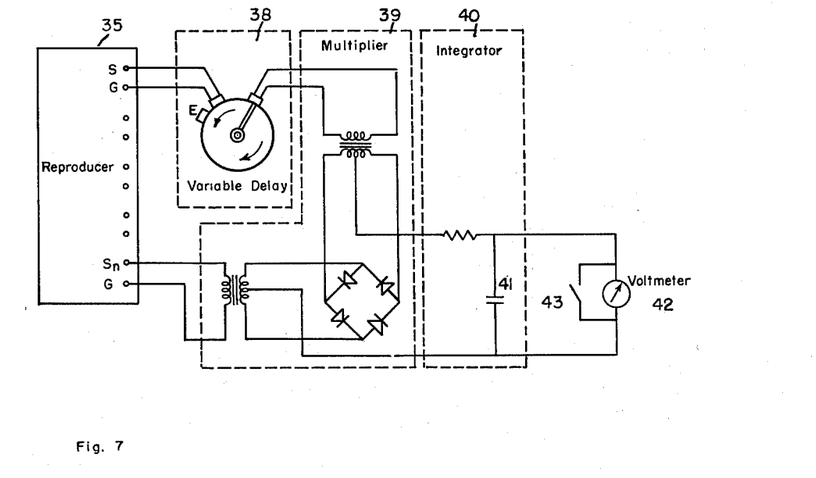
FIGURE 7 is a more detailed illustration of one channel of the type of apparatus diagrammatically illustrated in previous FIGURE 4.

FIGURE 7 is a detailed illustration of the preferred embodiments of the apparatus which can perform the object of the invention. Number 35 has been described in matters regarding FIGURE 4. The variable delay in this preferred form consists of a magnetic drum with a movable reproducing head and a fixed recording head such that the elapsed time between recording and reproducing can be adjusted at will. The adjustment is calibrated such that the exact time elapsed between recording and reproducing on this drum could be read accurately and directly.

The reproduce head may be fixed and the record head movable and the same net result achieved. Multiple fixed reproduce heads as shown in FIGURE 4A can be used with a movable record head and a multiplicity of delay times obtained of the counterpart signal. The amount of delay corresponding to any one adjustment is a function of the drum speed and the central angle between the record and the reproduce heads. It is necessary to maintain a constant drum speed in order to maintain accuracy in the delay time.

The erase head E is located just before the record head so that practically the full periphery of the drum is available for time delay. The variable delay drum denoted in FIGURE 7 effectively performs the operation of shifting, by any desired amount, trace S of FIGURE 3 (the counterpart signal) relative to the traces 1, 2, 3, and 4 (received signals). The drum is a distortionless piece of equipment in that it affects in no significant way the amplitude, frequency, or phase relationships of trace S relative to traces 1, 2, 3, and 4 but only provides a means of adjusting the time-phase relationship of trace S relative to the other traces. For an understanding of the multiplier 39 in FIGURE 7, reference may be had to French Patent 739,103 and U.S. Patent 2,025,158. For an understanding of the integrator 40, reference may be had to "Electronic Circuits and Tubes" by the Electronics Training Staff of the Cruft Laboratory, Harvard University, 1947, page 830. The voltmeter denoted 42 in FIGURE 7, which is included for the purpose of indicating the value of the sum accrued at the end of an integration period, can be a conventional voltmeter. The switch 43 is provided to discharge the condenser 41 on which the charge representing the sum has accumulated at the end of the integration period and after the reading has been made. This provides a zero reference base at the beginning of each integration period.

Figure 8:
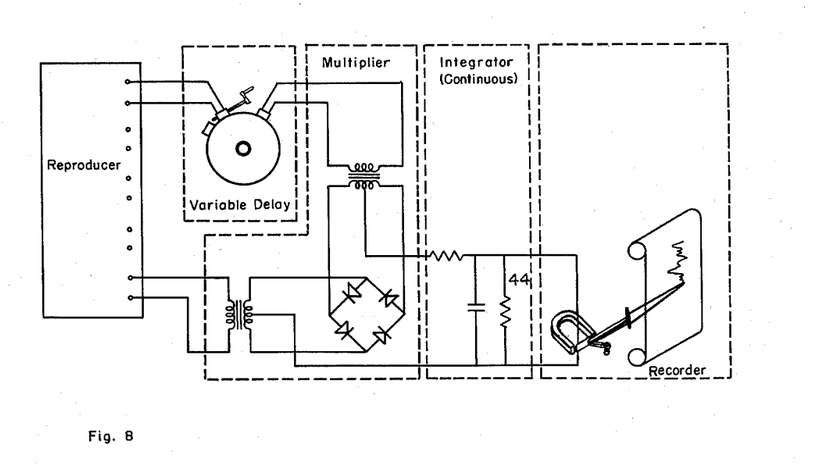
FIGURE 8 is an illustration of a modified form of apparatus generally similar to FIGURE 7 but capable of producing automatically a curve showing the data derived by this apparatus.

The distinction between FIGURES 8 and 7 lies in the integrator portion of the equipment. In FIGURE 7 an integrator is shown which accumulates the absolute total of the current running into the condenser; and a reading is made of the charge on the condenser at the end of each integration period. This is contrasted to the integrator shown in FIGURE 8 in which a continuous reading of the charge on a condenser is made; and the condenser does not accumulate the absolute total of the current influx to the condenser but rather has a charge on it proportional to the rate of current influx to the condenser. It will be noted in FIGURE 8 that a resistor 44 has been applied across the condenser corresponding to 41 in FIGURE 7. This resistor is adjusted to allow the charge on the condenser to continuously leak off and thus constantly seek the reference value it would reach if it were not for the current representing the products being fed into the condenser; consequently, the charge on the condenser is indicative of the rate of integration taking place. It is intended with this integration circuit to employ a continuously varying delay rather than a fixed delay for a fixed amount of time with incremental steps of adjustments being made in time. In other words, the record head will be moved continuously relatively to the reproduce head at a slow rate of speed. It has been observed that when the proper adjustments of such rate of relative movement and of the size of resistor 44 are made, a curve is obtained representing the charge on condenser 41 which is essentially the same information as is obtained in the process described in conjunction with FIGURE 7. Even though this is not a true correlation plot, it has been found that the significant data of the curves are the same; and the interpretation of the records remains the same. Since in the latter case there is continuously a significant value at the condenser terminals, the recording can be made in a continuous fashion; and for this purpose, a conventional oscillograph recorder may be employed. More specifically, the type of recorder shown is a mirror galvanometer recorder wherein a light beam is deflected onto a recording medium such as film or paper and thus photographically recorded. This type of recorder is preferable to pen recorders in that when multiple channels are employed the traces can cross over with no interruption of operation; whereas in multiple pen recorders, traces cannot cross.

Figure 9:
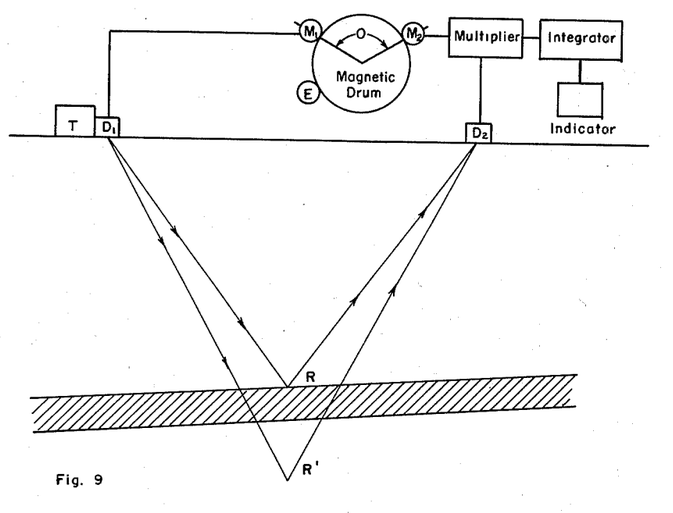
FIGURE 9 is illustrative of a field setup such as is contemplated by the aforesaid co-pending application over which the present method is an improvement.

In FIGURE 9, there is illustrated by means of schematic representation of apparatus the procedure as previously explained which would be followed in carrying out the method claimed in the aforesaid co-pending application, Serial No. 339,374. As previously indicated, one of the principal improvements in the present method over that claimed in said prior application is the fact that, in accordance with the present method, a field record is made which is then brought to the laboratory and replayed many times for the purpose of deriving carefully determined information which would not be practical by the use of the method as outlined in said co-pending application. The following is a more detailed enumeration of the advantages of the present method over those of the method claimed in said co-pending application.

In practicing the method claimed in application Serial No. 339,374, the graph which locates and identifies times at which maximum rates of integration are obtained is made by setting the time delay at a given value and integrating for a time sufficient to realize the required signal-to-noise ratio. The result of this integration or summation is then recorded. The delay time is then adjusted by an amount small enough to insure complete coverage of the time range. A new integration is then made for a period of time identical to the first integration period. This procedure is repeated as many times as may be necessary to cover the time range corresponding to travel time of signals to be measured.

Figure 10:
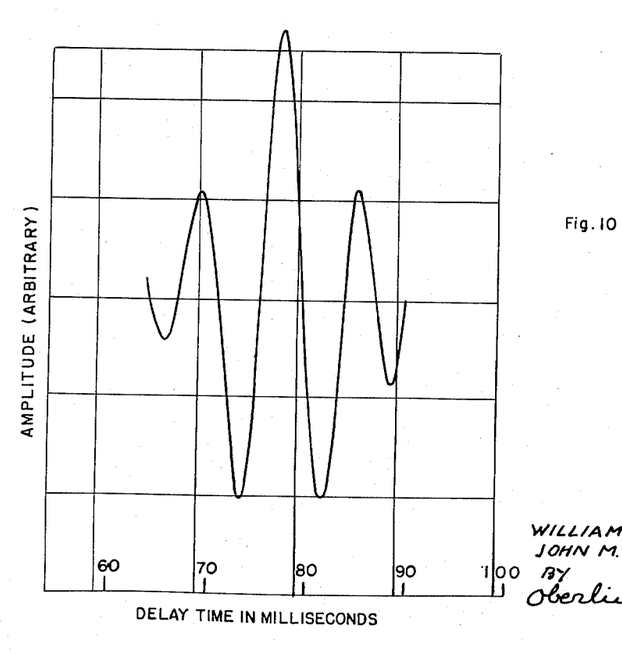
FIGURE 10 is illustrative of an actual correlation record obtained by transmitting an elastic signal through a section of the earth and receiving it at some distance. The frequency of the signal was varied from 20 to 80 cycles per second.

Plotted values for actual measurements in a seismic case are shown in FIGURE 10. In this case, the frequencies in the signal range from 20 to 80 cycles per second. The data points (corresponding to successive delay times) are at .002-second intervals; and the time of integration for each point was 30 seconds.

It is easily shown that in this particular case, which is typical of one practice of the method claimed in appplication Serial No. 339,374, it requires four hours to process a total time range of 1 second.

(500 integrations of 30 seconds
    duration=4 hours, 10 minutes)

If now a "memory" record is made of the vibrations received at the spaced detectors and of the counterpart signal, arrangements can be made to do the necessary multiplying and integrating at a later time and at a different location such as a laboratory eliminating the necessity for prolonged operation of the signal source.

It is also possible in the successive generation of the various signals to increase the speed of the playback apparatus so that the time required for the necessary multiplication and integration periods is reduced.

For example, in one preferred method, the field record of seismic vibration signals may be recorded on variable area type of tracks on photographic film at a speed of three inches per second and for a record length of 30 seconds (90 inches). After processing, this record may be spliced into a continuous loop and played back through appropriate apparatus at a speed of 12 inches per second, allowing complete multiplication and integration of any particular combination of recorded signals for a given time delay of the counterpart signal in 7½ seconds instead of 30 seconds. This allows complete processing of 1 second of time delay range in a total multiplication and integration time of 1 hour, 2½ minutes which is a considerable saving in time for anaylsis of the record.

Additional time saving is possible by further increasing the speed of playback. This illustration is given for the case in which the Western Electric Mirragraph recording and playback apparatus is used and represents a reasonable process for that apparatus. Use of certain varieties of magnetic recording and playback apparatus allows further speed up in the process than is possible with the Mirragraph.

Effect of proportionate changes in the frequencies of signals generated by the more rapid playback do not affect the results, provided the multiplier and integrator circuits are designed for the higher frequencies; and this offers no problem to one skilled in the art. If the same magnetic delay device is used with the speed-up process, it is necessary to recalibrate the time-delay readings to conform to the new record speed. For instance, if a certain angular displacement of the delay drum heads corresponds to a time delay of 1.2 seconds for a 1 to 1 ratio of playback to recording speeds, the same angular displacement (and same drum speed) would correspond to a time delay of 4.8 seconds for a 4 to 1 ratio of playback to recording speed.

Figure 11:
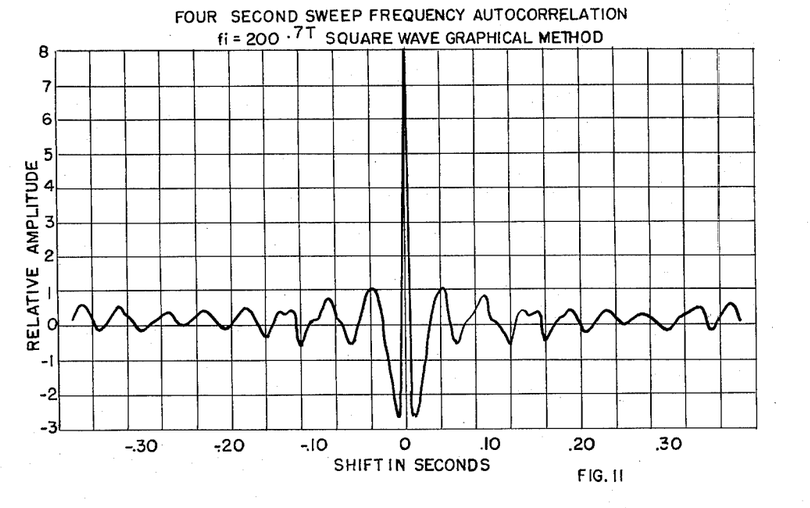
FIGURE 11 is illustrative of another autocorrelation curve corresponding to a square wave whose frequency changes exponentially with time from 20 to 80 cycles per second.

The shape of the function obtained by cross-correlating the transmitted signal and the received signal is dependent on the frequency content of the signals. A very broad frequency range, commonly referred to as white noise, with 0 relative phase shift between frequencies provides a very sharp or "spike" correlation curve shape; whereas the correlation curve becomes less "spiked" as the frequency range is restricted. It has been found, however, that a one or two octave range coinciding with the 20 to 80-cycles-per-second range described above does provide a correlation curve of such character that accurate time picks can be made. It has been further found that, in many cases, it may be desirable to further restrict the frequency range in order to improve the signal-to-interference ratio; that is, it has been observed that certain interfering wave types are predominant in a narrow frequency range; whereas signal is predominant in the remaining part of the frequency range; consequently, in this case, it is desirable to sacrifice the spiked character of the correlation curve in order to obtain a correlation curve essentially free of interference. There is shown in FIGURE 11 the correlation function that is obtained with a frequency spectrum of 20 to 80 cycles. It will be noted that there is very little possibility of a wrong pick on the phase coincidence time in this frequency range.

Figure 12:
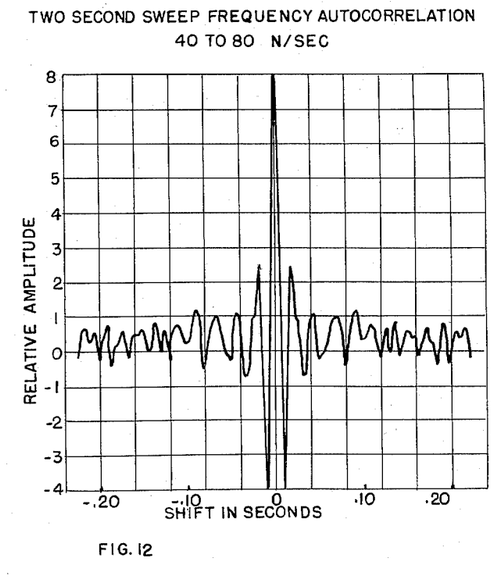
FIGURE 12 is illustrative of the autocorrelation function corresponding to a two-second sweep from 40 to 80 cycles per second.

There appears in FIGURE 12 the correlation function corresponding to a frequency range of 40 to 80 cycles; and again it would be very unlikely that a wrong pick would be made as to the phase coincidence time, even though the ratio of amplitude of the true peaks to adjacent peaks is smaller.

Figure 13:
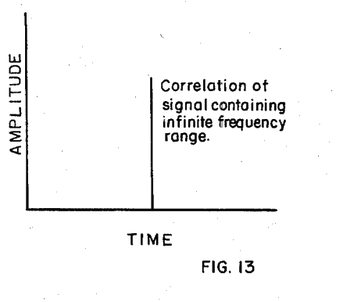
FIGURE 13 is illustrative of the autocorrelation of a signal containing an infinite frequency range (white noise).

In FIGURE 13, there appears a theoretical correlation plot corresponding to a white noise frequency range, that is from 0 to infinite frequency range. It may be desirable in some cases to operate over as wide a frequency range as possible in order to more nearly approach the spiked plot of FIGURE 13. It will generally be desirable to operate over as wide a range as is possible without generating a predominance of interference. For instance, it may be necessary to reject all frequencies below 40 but to maintain as wide a range above 40 as possible. It is a very important feature of this invention that the frequency range can be extended into the frequency range wherein the efficiency of the propagating medium is low by transmitting for a longer time those frequencies which are most greatly attenuated. In this way, a flat frequency spectrum covering a relatively wide frequency range can be realized such that a desirable correlation curve shape is obtained. This is possible by use of the present invention in that the total energy may be introduced into the earth over a substantial period as contrasted to the dynamite shot practice wherein all of the signal energy is introduced instantaneously.

There is a minimum time during which the non-repetitive signal must be transmitted. There is also a minimum time length during which the record must be made in the field.

The transmitted signal need not be a continuous series of vibrations. Thus, the transmitted signal may be made up of a series of bursts, which bursts are successions of energy pulses, and will be suitable provided that the composite signal thus made up of successive periods of pulsation with or without blank periods therebetween is not, as a composite signal, repetitive during a time interval which is longer than the longest travel time being determined. The length of a series should be sufficient so that upon multiplication of the transmitted signal with the counterpart signal and an integration of the product for the same length of time, there will be a signal-to-noise ratio of at least 2:1. Examples meeting the requirements of the foregoing include the operation of a vibrator for successive time-spaced periods, the minimum time of operation, however, being such as to provide a signal-to-noise ratio of at least 2:1 as aforesaid. Such time period may thus be shorter than the travel time. When shorter than the travel time, then there should be such blank spaces between successive periods as to make the composite signal as a whole non-repetitive during the travel time as explained herein. Instead of operating a vibrator for such short periods of time, it is contemplated also to provide generally similar forms of signal by the detonation of a series of explosions. On the other hand, the transmitted signal may be a continuing or uninterrupted series or a succession of energy pulses provided there is such variation therein that the transmitted signal is nonrepetitive for a time interval which is at least as long as the longest travel time being determined.

There are other factors which determine the minimum time length during which a record must be made in the field.

Since the determination of travel time is to be made by determining the amount which a substantially undelayed counterpart signal (not requiring appreciable travel time) must be shifted to match in phase a signal which is delayed by a finite travel time, it is clear that the time length of the recording must be sufficient to include a period at least as long as: the longest travel time being determined plus the uninterrupted duration (time of delivery of vibrational energy by the transmitter during any sweep) of said transmitted signal.

Since generation of energy in the field is not a costly process, it is practical to secure a record of sufficient length to be more than that required to provide the desired signal-to-noise ratio. This is usually not longer than 60 seconds. Sixty seconds of field record will ordinarily provide a signal-to-noise improvement of approximately 100 to 1. The one minute of field record may consist of a number of sweeps from the lowest frequency range to the upper frequency range and vice versa in order to facilitate the editing of the record in the laboratory.

It should be further pointed out that in the event multiple vibrator positions are being employed, the entire field record obtained would total 60 seconds; or if $n$ number of vibrator positions are employed, the signal from each position should be recorded (for convenience in interpretation) for $$\frac{60}{n}$$

seconds. For instance, if 6 vibrator positions are to be occupied for that particular seisphone setup, each vibrator position would be occupied for 10 seconds of record time; or the vibrator would generate energy for 10 seconds of record time.

In the preceding description where reference has been made to the minima of signal transmission time and field record time, the criteria established have been in respect of single vibrator location technique. When multiple vibrator location technique is employed, then the minimum time length of recording for each vibrator location is the same as that given above for single vibrator location technique. When using multiple vibrator location technique, however, the total time of transmission at all vibrator locations must be equal to at least the minimum established above for single vibrator location technique. It will be remembered that this minimum is determined by the integration time necessary to provide adequate signal-to-noise ratio. In multivibrator location technique, this minimum may, as indicated, be divided among the several locations, preferably uniformly so that if the actual minimum of transmission period for a given location when utilizing single vibrator location technique is two seconds, then if in the same location multiple vibrator location technique is used employing six different positions of the vibrator then the signal transmission time, if uniformly distributed between the six locations, would be ⅓ second at each location, the signals of such periods need to be different and preferably constitute different spectrum segments of a signal which is nonrepetitive during a time interval which is at least as long as the longest travel time.

The "memory" record is usually taken to the laboratory for processing in order to better insure proper handling in the development process. Once developed, this "memory" record is a time permanent record of the energy which was generated in the field and picked up at the receivers.

Rather than edit and destroy to a certain extent the original field record, prints may be made therefrom which may be clipped portions thereof to be assembled for processing in the manner described above. The print of the field or memory record which is prepared in the laboratory is further inspected in order to determine the probable length required to establish a desired signal-to-noise ratio. Once this has been established, the record is further investigated in order to cut it at those points corresponding to the ends of sweeps of the counterpart signal; that is, an attempt is made to obtain an integral number of frequency sweeps in the final record. A sweep refers to the traversing of the frequency range employed. It is not significant whether this range was traversed in ascending or descending fashion.

The record is formed into loops such that the reproducer continuously generates this energy for as long as needed and passes it into the multiplier, integrator, and associated apparatus. When making up the record loop, it must be of sufficient length to establish the desired signal-to-noise ratio. The record loop need not be a continuous loop formed of one or more sections of the record, but may consist of an open-ended segment or plurality of segments of the record which are arranged in end-to-end fashion on a suitable support as for example the periphery of a rotatable drum. It is possible to clip this print of the memory record to exactly one sweep, provided, as explained above, the time duration of the sweep is at least twice the maximum travel time to be determined. If this sweep is of sufficient duration to establish the desired signal-to-noise ratio, only this length of record need be processed. Once the signals have been multiplied and integrated at a particular time phase relationship for one loop length, no further improvement in signal-to-noise ratio is obtained by further multiplication and integration of this loop.

The reason for this can best be explained by having reference to FIGURE 5.

The more of a record having no duplicate portions which is multiplied and integrated, the greater will become the divergence between the solid and broken traces, i.e., the greater will become the signal-to-noise ratio. When, however, the same record is repeatedly multiplied and integrated, the final signal-to-noise ratio never becomes any greater than that which was obtained at the time the multiplication and integration was completed the first time. For instance, consider running a single record through several times. In this case, the correlation of the counterpart signal with the noise for one run is the same on successive runs of this identical record such that from that time on successive runs through the correlator will add noise linearly in the same fashion as signal adds linearly; consequently, the ratio is not changed once the one record has been fully integrated. A different situation exists in the case of multiple vibrator setups wherein it is necessary to take an equal length of record from each vibrator positions and each length must contain at least one full sweep of the frequency spectrum being used. It is desirable to obtain monitored record on a conventional galvonometer oscillograph in the field such that an inspection of the energy arriving at the far detectors can be made and the vibrator output or sweeps modified accordingly. There is a further advantage in this technique over conventional technique in the matter of adjusting recording amplifier gains. They are adjusted according to the energy actually observed before the recorder is turned on as contrasted to conventional technique of setting the gains on a basis of prediction rather than actual observed energy.

It has been suspected in conventional seismic practice that the frequency spectrum received at a distance might be significant; however, it was readily recognized that the lack of control on the source of generation and the lack of knowledge concerning the frequency spectrum and phase relations present near the energy source made any such study of a doubtful nature. Whereas, in the present technique providing control of the frequencies present and relative amplitudes of those frequencies in the source of energy, an intelligent study may be made of the frequency spectrum and phase relations arriving at receiver points via particular paths compared with the incident energy, thus constituting a source of information that is not available with present seismic techniques.

The following is an example of the manner in which the procedure of the present invention has been successfully practiced in the field. In an area in central Oklahoma, a vibrator having two counter-rotating weights, the off-balance portions of which weighed 4 pounds each at an effective radius of 3 inches, was driven through a gear mechanism by a gasoline engine of 22 horsepower rating. Signals were generated in approximately 5-second sweeps between frequencies of 20 and 80 cycles per second and recorded for a total duration of 40 seconds. Detectors were placed at the vibrator, 1,500 feet from the vibrator and at 100-foot intervals beyond the 1,500 foot position for a total of 10 detectors.

Records were made by means of a Western Electric Mirragraph recorder which utilizes variable area film recording. These records were subsequently taken to a laboratory where they were processed and spliced into loops corresponding to the 40 seconds of recording time. These loops were run through a Mirragraph reproducer which generated signals representative of the signals originally received at the field detectors. The counterpart signal was fed to a magnetic delay drum having a movable record head and ten fixed reproduce heads. The delayed counterpart signal and each received signal were immediately fed into an electronic multiplier and integrator which provided the data for plotting correlation curves over a time-delay range in increments of .002 second up to 1.2 seconds. The correlation curves for all detectors were placed in vertical juxtaposition in order of increasing lateral distance from the vibrator in a manner similar to conventional seismic records. In this arrangement phase coincidence peaks at approximately one second time delay were identified in significant time relation from trace to trace, which time relation identified the event as a seismic reflection. In this area, conventional seismograph yields reflections from this bed at the same effective time lapse and well-logs and seismic velocity surveys in the immediate vicinity identify this reflection as originating near the top of the Viola limestone which occurs at a depth of approximately 5,000 feet below the surface.

In defining certain critical periods of time in this description, such as the required recording time period and the time period or interval within which the signal must be nonrepetitive in form, the term "travel time" is employed in the sense of a time reasonably known to encompass the actual travel time whose precise measurement is the specific aim of the invention. In any concrete application of the invention, the approximate travel time will be known, since the area of investigation and the velocity of the waves will be known. This approximate maximum travel time, if used to establish the critical periods mentioned above, will permit the precise measurement of all actual travel times not greater than such maximum.

What is claimed is:

1. In the method of measuring the travel time along at least on path of propagation through the earth between spaced first and second points, of a vibratory signal of varying frequency and which is nonrepetitive during a time interval which is substantially longer than the travel time of such signal along any of those paths of its propagation through the earth by which it reaches said second point at usable energy levels, and wherein parameters of a signal substantially identical to the transmitted signal and the signal as received are cross-correlated by multiplication and integration at a predetermined number of time-phase relations to each other, the improvement which comprises:

(a) transmitting said vibratory signal from said first point;

(b) for a predetermined period recording, simultaneously and individually, parameters respectively of a signal substantially identical to said transmitted signal and of the signal as received at said second point after propagation through the earth over at least one of said paths, the record so provided being such that said parameters may be reproduced therefrom, during repeated playbacks, in known phase relationship relative to their phase relationship as recorded, said predetermined period of recording having a time duration which is: (i) at least as long as said travel time plus the uninterrupted duration of the nonrepetitive portion of said transmitted signal, (ii) but shorter than the time required to cross-correlate the said parameters by multiplication and integration at said predetermined number of time-phase relations;

(c) thereby providing a record containing separate time series respectively representative of said signal as transmitted from said first point and as received at said second point;

(d) cross-correlating the said time series while altering a said predetermined number of times their time-phase relation to each other;

(e) whereby said travel time is established in accordance with the value of time-phase relationship between said time series corresponding to a maximum value of the correlation magnitude.

2. The method of claim 1 in which said vibratory signal is elastic, is applied to earth and in which the displacement of the propagating medium by said signal, is within the elastic limit of said medium.

3. The method of measuring the travel time along at least on path of propagation through the earth between spaced first and second points, of a continuous vibratory signal of varying frequency and which is nonrepetitive during a time interval which is substantially longer than the travel time of such signal along any of those paths of its propagation through the earth by which it reaches said second point at usable energy levels, which comprises:

(a) sequentially transmitting through the earth such a signal from plural positions in a region adjacent said first point; and (b) during each such transmitting period and for a predetermined period, recording, simultaneously and individually, parameters respectively of a signal substantially identical to the transmitted signal and the signal as propagated through the earth to said second point, the record so provided being such that said parameters may be reproduced therefrom in a known phase relationship relative to their phase relationship as recorded, said predetermined period having a time duration which is (1) at least as long as said travel time plus the uninterrupted duration of said transmitted signal, but (2) shorter than the time required to cross-correlate the said parameters so as to provide a ratio of at least 2:1 between the signal and the noise in the correlation value corresponding to phase coincidence between said parameters, (c) thereby providing a record containing a plurality of time series respectively representative of said signal as transmitted and received;

(d) cross-correlating the time series representative of said signal as transmitted with each of said time series representative of said signal as received, while shifting the time-phase relation of the time series being correlated with respect to their phase relation as originally recorded, and (e) whereby said travel time is established in accordance with the amount of said time-phase shift which yields the greatest correlation magnitude.

4. The method of making a record from which may be determined the travel time along at least one path of propagation through the earth between spaced first and second points, of a continuous elastic vibratory signal varying in frequency and nonrepetitive during a time interval which is substantially longer than the travel time of such signal along any of those paths of its propagation through the earth by which it reaches said second point at usable energy levels, which comprises:

(a) transmitting such a signal from said first point; and (b) for a predetermined period recording, simultaneously and individually, a signal substantially identical to said transmitted signal and the signal as propagated to said second point over at least one of said paths through the earth, the record so provided being such that said signals may be reproduced therefrom in a known phase relationship relative to their phase relationship as recorded, said predetermined period having a time duration which is at least as long as said travel time plus the duration of the nonrepetitive portion of said transmitted signal.

5. The method of making a record from which may be determined the travel time along at least one path of propagation through the earth between spaced first and second points, of a continuous vibratory signal of varying frequency and which signal is nonrepetitive during a time interval which is substantially longer than the travel time of such signal along any of those paths of its propagation through the earth by which it reaches said second point at usable energy levels, which comprises:

(a) transmitting said signal from said first point;

(b) for a predetermined period recording, simultaneously and individually, parameters respectively of a signal substantially identical to said transmitted signal and the signal as propagated to said second point over at least one of said paths through the earth, the record so provided being such that said parameters may be reproduced therefrom in a known phase relationship relative to their phase relationship as recorded, said predetermined period having a time duration which is at least as long as said travel time plus the uninterrupted duration of said transmitted signal, (c) transmitting another such signal from said second point; and (d) for a predetermined period recording, simultaneously and individually, parameters respectively of a signal substantially identical to said transmitted signal and the signal as propagated to said first point over at least one of said paths through the earth, the record so provided being such that said parameters may be reproduced therefrom in a known phase relationship relative to their phase relationship as recorded, said predetermined period having a time duration which is at least as long as said travel time plus the uninterrupted duration of said transmitted signal.

6. In the analysis of travel time memory records of the type bearing a pair of record traces corresponding respectively to the parameters of a signal propagated over a time delay path and to the same signal as propagated over another path free from substantial time delay effects, said traces being nonrepetitive during an interval corresponding at least to the travel time of a path under investigation, the steps of (a) cutting said memory record to a length including substantially an exact number of multiples of said interval, and (b) forming said memory record into an endless configuration for repeated playback of the traces thereon.

7. A method as described in claim 3 in which said cross-correlation is performed by repeatedly reproducing and cross-correlating said representations while varying the time phase relation therebetween.

References Cited in the file of this patent

UNITED STATES PATENTS

| | | |
|---|---|---|
| 2,594,767 | Green | Apr. 29, 1952 |
| 2,638,402 | Lee | May 12, 1953 |
| 2,658,579 | Rieber | Nov. 10, 1953 |
| 2,671,375 | Boucher | Mar. 9, 1954 |
| 2,672,944 | Minton | Mar. 23, 1954 |
| 2,676,206 | Bennett | Apr. 20, 1954 |
| 2,696,891 | Newfeld | Dec. 14, 1954 |
| 2,732,025 | Lee | Jan. 24, 1956 |

UNITED STATES PATENT OFFICE
CERTIFICATE OF CORRECTION

Patent No. 2,989,726                                            June 20, 1961

John M. Crawford et al.

It is hereby certified that error appears in the above numbered patent requiring correction and that the said Letters Patent should read as corrected below.

Column 16, line 69, before "which" insert -- from --; column 18, line 55, and column 19, line 26, for "on", each occurrence, read -- one --.

Signed and sealed this 19th day of June 1962.

(SEAL)
Attest:

ERNEST W. SWIDER                                      DAVID L. LADD
Attesting Officer                                                Commissioner of Patents

UNITED STATES PATENT OFFICE
CERTIFICATE OF CORRECTION

Patent No. 2,989,726　　　　　　　　　　　　　June 20, 1961

John M. Crawford et al.

It is hereby certified that error appears in the above numbered patent requiring correction and that the said Letters Patent should read as corrected below.

Column 16, line 69, before "which" insert -- from --; column 18, line 55, and column 19, line 26, for "on", each occurrence, read -- one --.

Signed and sealed this 19th day of June 1962.

(SEAL)
Attest:

ERNEST W. SWIDER
Attesting Officer

DAVID L. LADD
Commissioner of Patents